Sept. 5, 1950 J. H. HOMRIGHOUS 2,521,008

TELEVISION AND SOUND MULTIPLEX SYSTEM

Filed June 27, 1944 4 Sheets-Sheet 1

INVENTOR.

John H. Homrighous

Sept. 5, 1950 J. H. HOMRIGHOUS 2,521,008

TELEVISION AND SOUND MULTIPLEX SYSTEM

Filed June 27, 1944 4 Sheets-Sheet 2

INVENTOR.

John H. Homrighous

TELEVISION AND SOUND MULTIPLEX SYSTEM

Filed June 27, 1944 4 Sheets-Sheet 3

INVENTOR.

John H. Homrighous

TELEVISION AND SOUND MULTIPLEX SYSTEM

Filed June 27, 1944 4 Sheets-Sheet 4

INVENTOR.

John H. Homrighous

Patented Sept. 5, 1950 2,521,008

UNITED STATES PATENT OFFICE 2,521,008

TELEVISION AND SOUND MULTIPLEX SYSTEM

John H. Homrighous, Oak Park, Ill.

Application June 27, 1944, Serial No. 542,317

12 Claims. (Cl. 178—5.6)

This invention relates to radio communication systems and more particularly to a television system for the transmission and reception of pictures and the accompanying sound.

One of the objects of my invention is to provide an improved system for controlling the scanning actions in cathode ray tubes both horizontally and vertically by control signal pulses having relative short periods of time, and signal pulses of the same amplitude, but having relative long periods of time.

Another object of my invention is to provide automatic deflection control or automatic picture size control, where the size of the reproduced picture is automatically maintained at a predetermined width and height.

Another object of my invention is to provide an improved method or system for the transmission and reception of sound signals on the same carrier with the picture signals.

Another object is to provide means for developing groups of control or line pulses separated by single pulses of longer duration for picture field control.

Another object is to provide an improved system for separating line and field control pulses having the same amplitude.

Another object is to provide means for transmitting time of day and weather reports simultaneously with the pictures.

Another object is to provide an improved method and system for controlling television receivers from conventional synchronizing signals.

Another object of my invention is an improved means for developing control signals of long and short duration during the interval between scanned lines in a field and between the picture fields for controlling the scanning action at the transmitter and to modulate the carrier with the developed control signals, during the interval between scanned lines and picture fields to thereby govern the scanning actions at the receiving station.

Another object is to provide an improved means for controlling interlace scanning.

Another object of my invention is to provide improved modulating controls for transmitting video signals and sound signals from two different messages on the same carrier.

Messages in this specification are to be understood to include any intelligence represented by sound, or picture signals.

The scanning control system described in this specification may employ control signals of equal amplitude and is somewhat similar to my "Self-synchronizing Systems" shown and described in copending applications Serial Number 451,722, filed July 21, 1942, now Patent No. 2,398,641, issued April 16, 1946, and Serial Number 476,897, filed February 24, 1943, in that the line control pulses may return the cathode ray from any location on its associated screen in the receiver station to the starting point for the next horizontal line, and the field control pulse may return the cathode ray from any location on its associated screen in the receiver to the starting point for the first horizontal line in another frame or picture.

This control system may be known also as "the follow up system," that is, the receiving station is not driven into synchronism but follows the horizontal and vertical movements of the transmitting station. This is a very versatile control system since a receiver may respond to any number of lines per picture and also to a wide range of picture frames per second.

Other objects and advantages of my invention will appear from the following description taken in connection with the accompanying drawings, in which.

Figures 1, 2, 4:
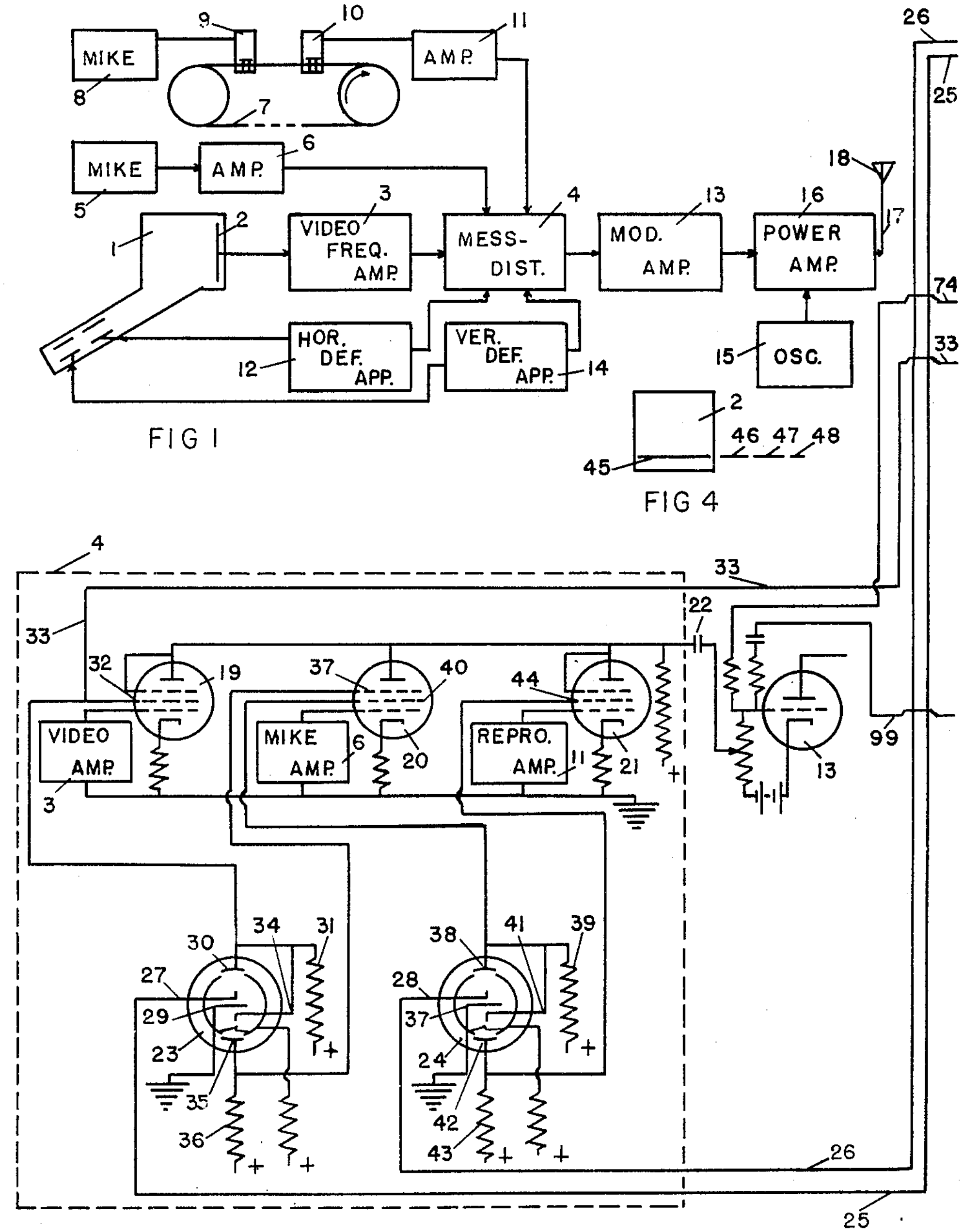
Figures 1 and 6 are simplified diagrammatic views of a television transmitting station and a television receiving station respectively; illustrating the principles applied in this invention.
Figure 2 is a circuit diagram showing the message distributor illustrated in Figure 1.
Figure 4 is a graphical view illustrating the time intervals for the various messages including the control signals.

With reference to Figure 1 the numeral 1 designates a cathode ray transmitting tube of conventional type, and as illustrated it comprises a mosaic 2, a photo electric screen on which a light image of the object is projected and an electron gun for generating a ray of electrons directed toward the screen and two sets of deflecting plates for deflecting the electron ray at the line and field frequencies, so that it is caused to scan the screen. The picture signals are thereby developed and fed to a video frequency amplifier 3; from the amplifier 3 the video or picture signals are fed to the message distributor 4. Likewise signals from the microphone 5 for sound associated with the pictures are fed through the amplifier 6 to the message distributor 4. Sound signals from a different message, for instance weather reports and time of day reports, recorded on an endless magnetic wire 7 through the microphone 8 and recording coil 9 are reproduced by the coil 10, amplified at 11 and fed to the message distributor 4.

The message distributor 4 allots suitable periods of time during each horizontal saw tooth wave developed in the horizontal deflecting apparatus 12 for the picture signals and fragments of sound signals from two different messages which are fed to the modulating amplifier 13 together with the horizontal control signals from the deflecting apparatus 12 and the vertical control signals from the vertical deflecting apparatus 14. The picture signals and sound signals for both messages occurring between the line control signals, and the frame control signals occurring between groups of line signals for the lines in picture fields or frames.

A carrier wave is provided by the oscillator 15. In the power amplifier 16 this carrier wave is modulated by the picture signals, sound signals, and control signals, which are applied by a connection 17 to the antenna 18.

Sound signals from two different messages, picture signals, and control signals may be transmitted on the same carrier where the rate of change from one message to another message is considerably greater than the frequency of electrical signals produced by sound.

With reference to Figure 2 the message distributor 4 for alloting suitable periods of time in a saw tooth wave for several messages comprises multi-element gate amplifier tubes 19, 20, and 21 having their anodes connected together and coupled through condenser 22 to the grid of the modulating amplifier 13. Video amplifier 3 output is connected in the cathode grid circuit of amplifier 19, sound amplifier 6 is connected to the cathode grid circuit of amplifier 20 and the output from sound amplifier 11 is connected to the cathode grid input circuit of amplifier 21.

Off and on relay or impulse tubes 23 and 24 and other like tubes throughout this specification may be similar to those described in my copending application Serial Number 521,337, filed February 7, 1944, now Patent No. 2,442,565, granted June 1, 1948. To describe briefly the electrons may be rotated from and onto the small high potential anode by changes in voltage on the control electrode.

Figure 3:
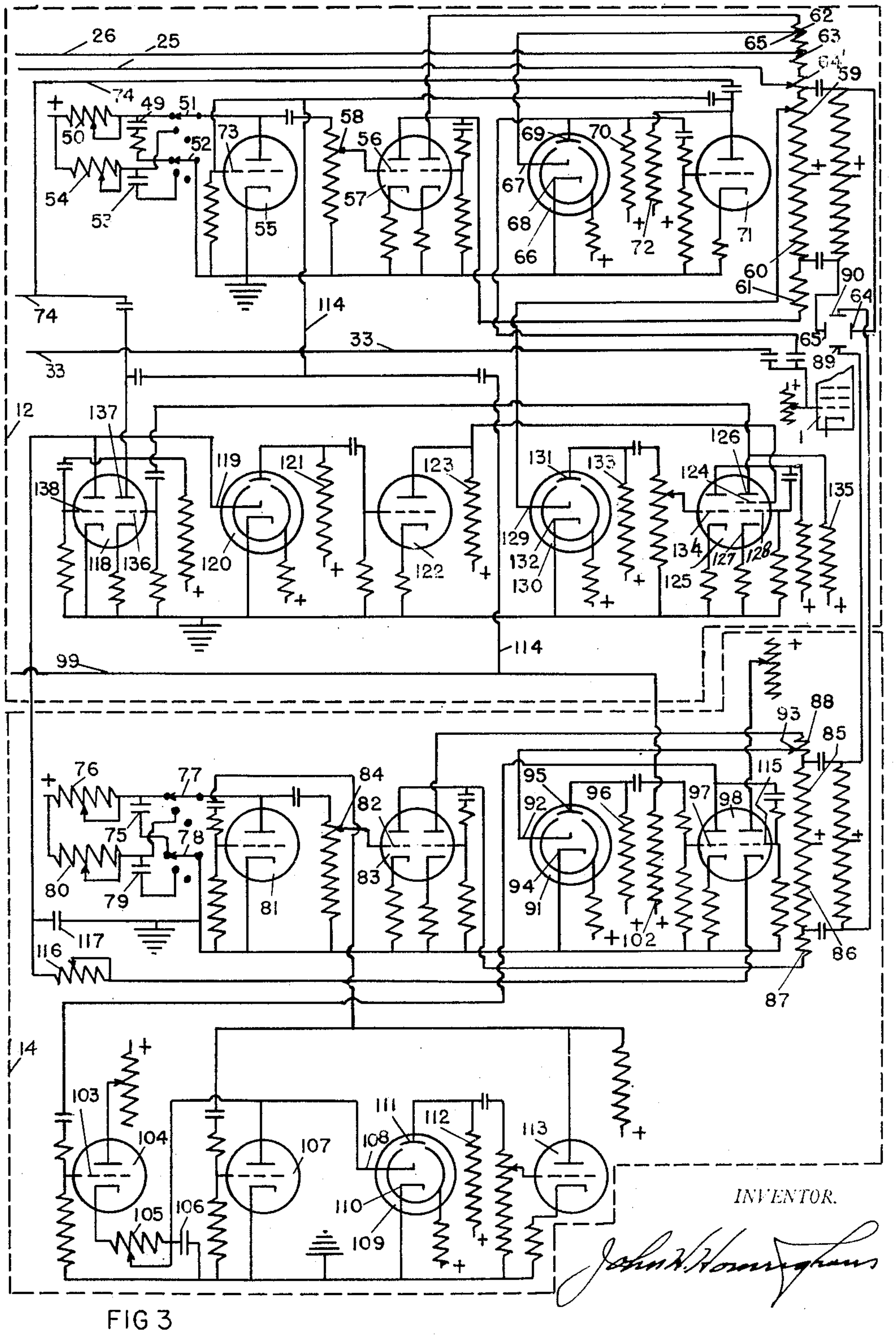
Figure 3 is a circuit diagram showing the horizontal and vertical deflecting apparatus illustrated in Figure 1.

These tubes 23 and 24 are controlled by saw tooth potentials developed in the apparatus and associated circuits of Figure 3 and applied over conductors 25 and 26 to the control electrodes 27 and 28 respectively. As each saw tooth wave is developed for deflecting the electron ray forward over its associated screen, to be explained later, the gradually increasing potential is applied to the control electrode 27 and 28 which may be adjusted in the circuits of Figure 3 so that the potential on control electrode 27 may permit the electrons from the cathode 29 to flow to the anode 30 at the time the electron ray in the cathode ray tube 1 reaches the leaving edge of the image screen 2 so that the picture signals developed on the forward horizontal movement of the electron ray are fed to the input circuit of the amplifier tube 19, the output of tube 19 being applied to the control grid of modulation amplifier 13. Current flowing through the anode 30, cathode 29, circuit of tube 23 causes a potential drop at the load resistor 31 which is applied to the grid 32 of tube 19 to block any signalling current in this tube during further increases in the saw tooth potential. This drop in potential at resistor 31 is also applied over conductor 33 to the control electrode in the cathode ray tube 1 Figure 3 to substantially extinguish the electron ray during further increases in the saw tooth potentials.

The potential drop at the load resistor 31 is applied to the control electrode 34 which may rotate or block the electrons from the anode 35, thereby increasing the potential at load resistor 36 and on the grid 37 in tube 20 thus permitting sound signals from the amplifier 6 to be supplied to the control grid of the modulation amplifier 13 immediately after the picture signals were modulated. However, after a short period of time for modulating the sound signals from amplifier 6 the saw tooth potential on the control electrode 28 in tube 24 will have increased to permit electrons to flow from the cathode 37 to the anode 38, thus producing a potential drop at the load resistor 39 which is applied to the grid 40 in tube 20 to block the cathode anode signalling current through the tube 20. The potential drop at resistor 39 is also applied to control electrode 41, which drives the electrons from anode 42, thus increasing the potential at the load resistor 43, and to the grid 44 in tube 21. The increase potential on grid 44 renders tube 21 conductive to sound signals from the reproduction amplifier 11 immediately after the sound signals from amplifier 6 have been blocked. After the tube 21 has become conductive for a short period of time control signals are developed in the circuits of Figure 3 to trigger the saw tooth voltages and to restore the circuits of Figure 2 to start another group of signals comprising picture signals, and sound signals from two different messages through the amplifiers 3, 6 and 11 respectively.

Referring to Figure 4 the different periods of time for the several different signals may be as illustrated wherein 2 may represent the mosaic screen and the line 45 the period of time for picture signals, 46 may represent the period of time for sound signals associated with the picture signals, 47 sound signals from a different message, such as time of day and weather reports, and 48 may represent the period of time for horizontal control signals. It is to be understood that the period of time for any of the several signals may be varied to suit conditions.

From the above description it is seen that picture signals and signals from two different sources of sound together with control signals may be modulated in successive rotation on a single carrier. The horizontal line deflection may be at fifteen thousand per second or higher which causes the sound signals to be interrupted at the same rate. The rate of interruption being relatively high and near the upper range of audibility they will not cause objectionable interference in the sound reproduction.

With reference to Figure 3, the apparatus and associated circuits 12 for producing horizontal sweep voltages comprise a condenser 49 charged through an adjustable resistor 50 from a source of positive potential as indicated. By movement of the switches 51 and 52, another condenser 53 may be charged through resistor 54 from a source of positive potential to vary the line frequency for horizontal deflection. Other line frequency variations may be obtained by providing other resistors and condensers connected to the vacant switch contacts.

When the condenser 49 or 53 becomes charged, depending upon which switch contacts are closed, the saw-tooth voltage wave in the plate circuit of tube 55 is impressed on the grid 56 of multiunit tube 57 through an adjustable contact on resistor 58 for controlling or adjusting the amplitude of the saw-tooth voltage wave. The double anode output of the amplifier 57 supplied to the load resistors 59, 60, 61, 62, 63 and 64 will change the potential on the horizontal deflecting plates 64 and 65 of tube 1 to effect in a well known manner the horizontal movement of the electron ray.

To initiate the discharge of condensers 49 or 53, I provide an off and on relay tube 66 having its control electrode 67 connected to the load resistor 62 through an adjustable contact 65. As the saw-tooth voltage increases to a suitable amplitude to cover the time periods for picture and sound signals the electrode 67 becomes more positive thus permitting electrons to flow from the cathode 68 to the anode 69, causing a voltage drop at load resistor 70 which is applied to the control grid of tube 71 thereby increasing the potential at load resistor 72 to produce a positive pulse which may be applied to the grid 73 of the trigger tube 55 rendering this tube conductive to discharge the condenser 49 or 53, thus returning the cathode ray to start scanning the next horizontal line. The discharge of the condenser 49 produces a potential drop in the load resistor 62 which is applied to control electrode 67 to drive or rotate the electrons from the anode 69. Likewise the potential drop in load resistor 63 and 64, supplied over conductors 26 and 25 to the control electrodes 28 and 27 in tubes 24 and 23, restores the circuits of the message distributor 4 to the proper condition to again start modulating picture signals.

The positive pulse developed in tube 71 may be supplied over conductor 74 to the grid of modulation amplifier 13 to modulate the carrier with a pulse during horizontal retrace or as the condenser 49 is being discharged to control the scanning action at the receivers. The voltage drop at resistor 70 may also be applied to the control grid of the cathode ray tube 1 to substantially extinguish the ray during retrace.

From the foregoing it will be understood that the tube 66 initiates the control impulse for the line return trace of the cathode ray, and causes the carrier to be modulated with a high amplitude signal after the termination of each group of signals comprising picture signals and fragments of sound signals from two different sources. Furthermore, line frequency may be varied to meet any operating condition through the condensers 49 and 53 and the adjustment of the resistances 50 and 54.

The apparatus and associated circuits 14 for producing vertical sweep voltages are similar to the apparatus and circuits used for horizontal sweep voltages and comprise a condenser 75 charged through an adjustable resistance 76 from a source of positive potential as indicated. By movement of the switches 77 and 78 another condenser 79 may be charged through resistance 80 from a source of positive potential to vary the frame frequency.

When the condensers 75 or 79 become charged, depending upon which switch contacts are closed, the saw-tooth voltage wave in the plate circuit of tube 81 is impressed on the grid 82 of multiunit tube 83 through an adjustable contact 84 for adjusting the amplitude of the saw-tooth wave. The double anode output of the amplifier 83 supplied to the load resistors 85, 86, 87 and 88 will change the potential on the vertical deflecting plates 89 and 90 of tube 1 to effect the vertical forward movement of the electron ray.

Figure 5:
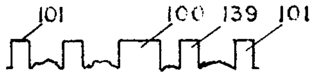
Figure 5 is a graphical view illustrating horizontal and vertical control pulses.

To initiate the discharge of condenser 75 or 79, I provide an off and on impulse tube 91 having its control electrode 92 connected to the load resistor 88 through an adjustable contact 93. As the vertical saw-tooth voltage increases to a suitable amplitude to cause the cathode ray to travel vertically over the screen, the electrode 92 becomes more positive thus permitting electrons to flow from the cathode 94 to the anode 95 causing a voltage drop at load resistor 96 which is applied to the control grid 97 of tube 98 thereby causing a positive pulse to be supplied over conductor 99 to the grid of modulation amplifier 13, to modulate the carrier between picture frames with a vertical control signal. The vertical control signal or pulse may be for a longer time interval than the horizontal control pulses as illustrated in Figure 5 where 100 may represent a vertical control pulse and 101 may represent horizontal control pulses having equal amplitude. In order to produce a pulse having a relatively long period of substantially constant amplitude, the increases in potential at load resistor 102 may also be applied to the grid 103 of tube 104 to cause anode cathode current to flow through the adjustable resistance 105 to charge the condenser 106. As the condenser 106 becomes charged the potential in the plate circuit of trigger tube 107 is impressed on the control electrode 108 of off and on impulse tube 109. After a suitable length of time depending on the value of resistance 105 and condenser 106 the electrons may flow from the cathode 110 to the anode 111 causing a voltage drop at resistance 112 which is applied to the control grid of tube 113 initiating a positive pulse to trigger tubes 81 and 107 discharging the condensers 75 and 106 to return the cathode ray to start the first line in the next field. The positive pulse over conductor 99 may also be applied over the connecting conductor 114 to the grid of horizontal trigger tube 55 to return the cathode ray horizontally each time the ray is returned vertically.

From the above description it is seen that a vertical control pulse may be produced at the end of each field to initiate both the vertical and horizontal retrace, extinguish the cathode ray during retrace and modulate the carrier with a relatively wide control pulse between pictures. Furthermore, line and frame frequency may be varied to meet any operating condition.

It is to be understood that picture signals and the control signals may be transmitted on the same carrier and the accompanying sound signals may be transmitted on another carrier in which case the cathode ray return or retrace would be initiated at the leaving edge of the mosaic.

To provide interlace scanning where the lines of one field fall in between the lines of the previous field, I provide means for initiating the backward horizontal deflection of the ray from substantially the mid-point of the screen for the first horizontal line in alternate fields. In order to trigger tube 55 at the mid-point of a line, the increase of potential at the load resistor 102 occurring at the end of each scanned field is applied to the grid 115 to cause anode cathode current to flow for a short period of time through the adjustable resistor 116 to charge the condenser 117. As the condenser 117 receives a charge at the end of each forward vertical trace the potential in the first plate circuit of tube 118 is impressed on the control electrode 119 of the impulse tube 120. The values of the resistor 116 and condenser 117 are chosen so that at the end of alternate field periods or for each two momentary charges of current through the resistor 116 the control electrode 119 will become sufficiently positive to permit current to flow through the tube 120. The voltage drop at load resistor 121 may be applied to the grid of tube 122 increasing the potential at load resistors 123 which may be applied to the grid 124 in tube 125. The increased potential on grid 124 may permit current to flow from the plate 126 to the cathode 127 when the potential on control grid 128 is increased. The control electrode 129 in the impulse tube 130 may be connected to the load resistor 59 and adjusted so that as the horizontal saw-tooth potential is increasing the control electrode 129 will become sufficiently positive when the cathode ray has reached substantially the mid-point of the screen or further along when sound is modulated on the same carrier, to permit current to flow from the anode 131 to the cathode 132 causing a voltage drop at resistor 133 which is applied to control grid 134; after suitable amplification the impulse is fed to the control grid 128 and if the grid 124 is sufficiently positive to permit current to flow which is the condition in alternate fields as explained above, causing a voltage drop at load resistor 135 which is applied to the control grid 136 in tube 118. The voltage drop on grid 136 causes a high potential pulse on the anode 137 which is applied to the grid 73 of trigger tube 55 discharging the condenser 49 to return the cathode ray to start the second line. This same pulse may be applied to conductor 74 to modulate the carrier. The pulse on the anode 137 may also be applied to the grid 138 of tube 118 causing the condenser 117 to be discharged through the first anode circuit of tube 118.

From the above description it is shown that the cathode ray will be returned or deflected backward from substantially the mid-point of the screen in the first line in alternate fields which will place the lines in one field in between the lines of the previous field; also the carrier will be modulated with a control signal as illustrated at 139 Figure 5 in alternate fields to control the horizontal backward deflection of the cathode ray in the receiver from the mid-point of the screen, to be further explained later.

From the description it is shown that horizontal control pulses are produced in groups separated by vertical control pulses of longer duration for controlling the scanning actions at the transmitter, and that these pulses are modulated on a carrier for controlling similar scanning actions at receiver stations.

Figures 6, 7, 9:
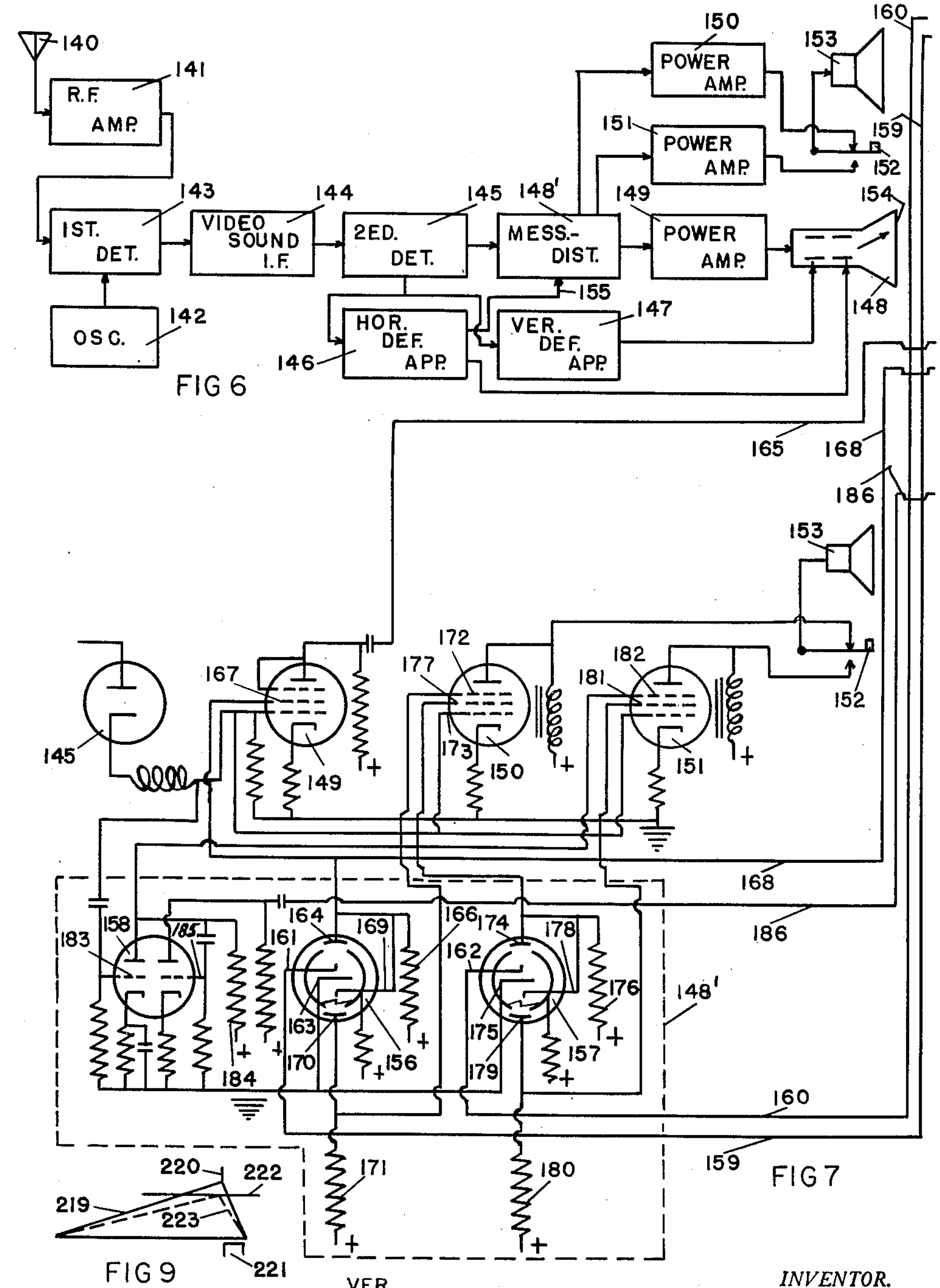
Figure 7 is a circuit diagram showing the message distributor illustrated in Figure 6.
Figure 9 is a graphical view of a saw tooth wave.

With reference to Figure 6, showing a receiving station, the antenna 140 receives the carrier signals from the transmitter antenna 18 to a radio frequency amplifier 141. An oscillator 142 reacts with these signals in the first detector stage 143 on the heterodyne principle to produce an intermediate frequency which is supplied to the video and sound intermediate frequency stage 144. After suitable amplification the video signals, sound signals and control signals are demodulated at 145. The control signals being of greater amplitude are separated and fed to the horizontal and vertical deflecting apparatus and associated circuits 146 and 147 to control the scanning actions in the viewing tube 148. The video signals and sound signals from two different sources are fed from the second detector 145 to the message distributor 148′ where the several signals are separated and allotted suitable periods of time and then fed to individual power amplifiers 149, 150 and 151. The picture signals being supplied to the power amplifier 149, the sound signals accompanying the pictures being supplied to the power amplifier 150 and the sound signals for time of day and weather reports being supplied to the power amplifier 151. A key 152 is provided for switching the loud speaker 153 from the reproduction of sound signals accompanying the pictures at the amplifier 150 to the reproduction of signals from amplifier 151. The video or picture signals are fed from the amplifier 149 to the viewing tube 148. The viewing tube 148 is represented as being in the form of a cathode ray tube of a conventional type and comprises a fluorescence screen 154, an electron gun for developing a ray of electrons directed toward the screen, and two sets of electrostatic plates for deflecting the electron ray at the line and field frequencies to cause it to scan the screen. The video signals are applied to the control electrode of the electron gun, whereby, the intensity of the electron ray is made to vary with the video or picture signals. The horizontal saw-tooth voltages are fed over conductor 155 to the message distributor 148′ for controlling the several time periods.

With reference to Figure 7, the message distributor 148′ for alloting suitable periods of time in the interval of a saw-tooth wave for several received messages comprises two off and on impulse tubes 156 and 157 for controlling the power amplifiers 149, 150 and 151, and a multiunit tube 158 for separating control signals from the picture and sound signals. The tubes 156 and 157 are controlled by saw-tooth voltages developed in the apparatus and associated circuits of Figure 8 and applied over conductors 159 and 160 to the control electrodes 161 and 162 respectively. As each saw-tooth wave is developed for deflecting the electron ray forward over its associated screen, to be explained later, the gradually increasing potential is applied to the control electrodes 161 and 162 which may be adjusted in the circuits of Figure 8 so that the potential on the control electrode 161 may permit the electrons from the cathode 163 to flow to the anode 164 at the time the electron ray in the cathode ray tube 148 reaches the leaving edge of the screen 154, so that received picture signals from the detector 145 may be supplied to the control grid of the power or gate amplifier 149, and after suitable amplification in this tube they are applied over conductor 165 to the control grid of the viewing tube 148 where they are reproduced on the forward horizontal movement of the ray. As soon as current flows from the anode 164 to the cathode 163 a voltage drop is developed at the load resistor 166 which is applied to the grid 167 to render tube 149 inoperative to any further signals applied to its control grid during further increases in the saw-tooth potential or during the time that sound signals and control signals are being received. The drop in potential at resistor 166 is also applied over conductor 168 to the control grid of picture tube 148 to substantially extinguish the electron ray during reception of sound signals and control signals or during further increases in the saw-tooth voltage developed in the circuits of Figure 8.

The potential drop at the resistor 166 is applied to the control electrode 169 which may rotate or block the electrons from the anode 170, thereby increasing the potential at load resistor 171 and to the grid 172 in the gate amplifier tube 150, thus permitting received sound signals applied to the control grid 173 to be amplified in tube 150, and supplied to the loud speaker 153 through the key 152 immediately after the reproduction of the picture signals. A short period of time after the reception of sound signals the saw-tooth voltage on control electrode 162 will have increased to permit current to flow from the anode 174 to the cathode 175 thus producing a potential drop at the load resistor 176 which is applied to the grid 177 in tube 150 thus blocking this tube to any signals on the control grid during further increases in saw-tooth potentials. The drop in potential at resistor 176 is also applied to the control grid 178 rotating or blocking current flow from the anode 179, thereby increasing the potential at resistor 180 and grid 181. As soon as the potential on grid 181 is increased the gate amplifier tube 151 becomes sensitive to received sound signals from a second message, such as time of day or weather reports, which may be reproduced at any time by pressing key 152 to connect the loud speaker to the output of tube 151. After tube 151 has become conductive to sound signals for a short period of time the tube 151 becomes blocked by negative potential on the grid 182 controlled by received signals or impulses as will be presently explained.

Control signals demodulated at 145, after the sound signals from fragments of a second message have been demodulated, are blocked from effecting the power amplifiers 149 and 150 as explained above. However, received horizontal and vertical control impulses of relatively high amplitude as illustrated in Figure 5 may be applied to the grid 183 of tube 158, the grid being biased to prevent picture or sound signals from effecting the output. The control impulses applied to grid 183 cause a voltage drop at resistance 184 which is applied to grid 182 of tube 151 to block this tube during the retrace period. The pulses in the first anode circuit of tube 158 are applied to grid 185 and after suitable amplification in the second anode cathode circuit of this tube the pulses are fed over conductor 186 to the circuits of Figure 8 to control the saw-tooth voltages and restore the circuits of Figure 7 to start reception of another series of signals comprising picture signals and sound signals from two different messages.

Figure 8:
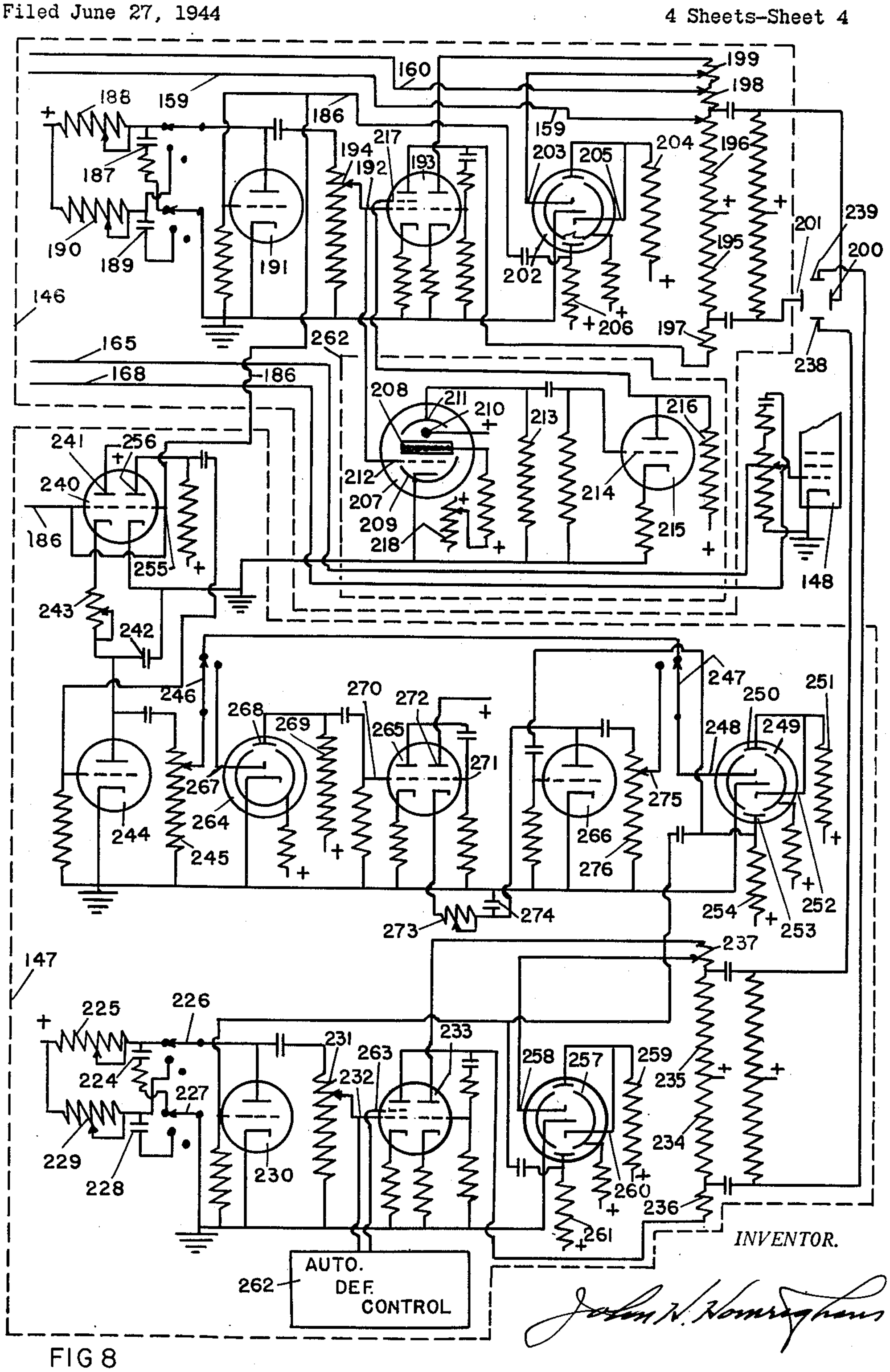
Figure 8 is a circuit diagram showing the horizontal and vertical deflecting apparatus illustrated in Figure 6.

With reference to Figure 8 the apparatus and associated circuits 146 for deflecting the cathode ray horizontally and for producing the saw-tooth potentials to control the circuits of Figure 7 comprise a condenser 187 charged through an adjustable resistor 188 from a source of positive potential as indicated, another condenser 189 and resistor 190 may be employed to change the charging rate.

When the condenser 187 becomes charged, the saw-tooth voltage wave in the plate circuit of tube 191 is impressed on the grid 192 of multi unit tube 193 through an adjustable contact on resistor 194 for controlling the amplitude of the saw-tooth voltage wave. The double anode output of the amplifier 193 supplied to the load resistors 195, 196, 197, 198 and 199 will change the potential on the horizontal deflecting plates 200 and 201 of tube 148 to effect in a well known manner the horizontal movement of the electron ray.

Control signals from conductor 186 applied to the control grid of trigger tube 191 renders this tube conductive to discharge condenser 187 and to restore the circuits of Figure 7 to start the next series of received signals. Regardless of when the horizontal signals are received the tube 191 may become conductive to discharge the condenser 187 to return the electron ray from any point reached on the screen to start the next line, therefore, the horizontal scanning action may be synchronized with the transmitter upon the reception of the first horizontal control signal.

To initiate the discharge of condenser 187 in the absence of control signals due to fading or when tuning the set, I provide an off and on impulse tube 202 having its control electrode 203 connected to the load resistor 199. As the saw-tooth voltage increases to a suitable amplitude, to cover the predetermined time periods for picture and sound signals the electrode 203 becomes sufficiently positive to permit current to flow through the load resistor 204, causing a voltage drop to be applied to the control electrode 205 blocking the current flow through load resistor 206, thereby producing an impulse which may be applied to the control grid of trigger tube 191.

In order to provide automatic deflection control or automatic picture size I employ a slow-acting tube 207 for controlling the current flow in tube 193. The slow-acting tube is described in my co-pending application Serial No. 541,941, filed June 24, 1944, now Patent No. 2,425,877, issued August 19, 1947. Briefly this tube comprises a triode having an anode 208 of mesh material covered with luminescent material of rather slow decay. As the electrons strike the plate it may glow with a brillancy determined by the grid potential. The member 209 is a shield at cathode potential to direct the electrons toward the plate. Adjacent to the anode is a photo electric device comprising an anode 210 and cathode 211 adapted to be actuated by the brilliancy of the triode plate.

The control grid 212 in tube 207 is connected in parallel to the control grid 192 in tube 193. As the saw-tooth potential increases more electrons will flow from the cathode to the plate 208, thereby increasing its brillancy which is reflected to the cathode 211 causing an increase in current from positive potential at anode 210 to cathode 211 through resistor 213, which may be applied to the grid 214 in the tube 215. The anode output of amplifier 215 supplied to the load resistor 216 causes a potential change on the grid 217 to control the current flow through tube 193. In other words, as the plate 208 increases in brilliancy the grid 217 becomes more negative to reduce the current through tube 193. The operation is as follows: the saw-tooth wave produced by charging and discharging a condenser is adjusted so that the desired amplitude is reached a short period of time before the control pulse is received to discharge the condenser, or the saw-tooth potential developed on the grid 212 is greater than required which will cause the plate 208 to obtain a certain value, which may be adjusted at the voltage divider 218 to regulate the potential on the grid 217, thereby adjusting the current flow in the tube 193, which changes the potential on the load resistors 195 to 199 inclusive. Since the luminescence or phosphorescence material on the anode 208 is of relatively slow decay it will maintain the current through its associated photo electric device substantially constant during recurring saw-tooth waves.

Figure 9 illustrates two saw-tooth waves, one with high amplitude and the other with lower or adjusted amplitude. The solid line 219 represents the increasing potential of a saw-tooth wave developed in the triode of tube 207 which is triggered at 220 by the impulse represented at 221. The horizontal line 222 represents the required amplitude and the dashed line 223 may represent the adjusted potential of the saw-tooth wave developed in the output of tube 193.

From the above description it has been shown that the amplitude of saw-tooth waves may be automatically adjusted or maintained substantially constant, which means that the picture size in television may be automatically adjusted and maintained at the desired screen size.

The apparatus and associated circuits 147 for producing vertical sweep voltages comprise a condenser 224 charged through an adjustable resistor 225 from a source of positive potential as indicated. By movement of the switches 226 and 227 another condenser 228 may be charged through resistor 229 from a source of positive potential to vary the frame or field frequency for vertical deflection. The increasing potential in the plate circuit of tube 230 is supplied through the adjustable resistor 231 to the grid 232 of multi unit tube 233. The double anode output of amplifier 233 is fed through load resistors 234, 235, 236 and 237, which changes the potential on the vertical deflecting plates 238 and 239 of tube 148 to effect the vertical movement of the electron ray.

Horizontal and vertical control signals from conductor 186 are impressed on the control grid of trigger tube 191 and also to the grids of the double unit tube 240. The vertical control signals or impulses will trigger the tube 191 to discharge the condenser 187 thus deflecting the cathode ray backward horizontally each time a vertical control signal is received. The control signals both horizontal and vertical impressed on the grids of tube 240 cause current to flow from the anode 241 to the cathode to charge the condenser 242 through the adjustable resistor 243. The increasing potential on the plate of tube 244 is applied through the adjustable resistor 245, switches 246 and 247 to the control electrode 248 in impulse tube 249. Pulses of short duration or horizontal control pulses will not increase the potential on the electrode 248 sufficiently to permit current to flow from the anode 250. However, a pulse of relatively long duration or a vertical control signal causes the condenser 242 to be charged over a longer period of time, thereby increasing the potential on electrode 248 to permit the electrons to flow to the plate 250 causing a voltage drop at load resistor 251, which is applied to the control electrode 252 blocking the current from the anode 253 to increase the potential at resistor 254, which is applied to the grid of trigger tube 230, causing this tube to become conductive discharging the condenser 224, and causing the vertical backward deflection of the electron ray.

The control signals impressed on the grids of tube 240 charge and discharge the condenser 242. As the control impulse is initiated on the grid 255 current flow through the anode 256 is increased causing a voltage drop to be applied to the grid of trigger tube 244, but as the grid 255 is restored to normal or becomes less positive, the voltage on the grid of tube 244 becomes more positive causing this tube to become conductive discharging the condenser 242.

From the above it is seen that the condenser 242 will be charged and discharged for each received control signal both horizontal and vertical. But only the vertical control pulses of relatively long duration cause the discharge of condenser 224 to deflect the electron ray backward vertically.

To initiate the discharge of condenser 224 in the absence of vertical control signals due to fading or when tuning the set, I provide an off and on impulse tube 257 having its control electrode 258 connected to the load resistor 237. As the saw-tooth voltage increases to a suitable amplitude to cause the electron ray to be deflected over the desired screen height, the electrode 258 becomes sufficiently positive to permit current to flow through the load resistor 259 causing a voltage drop to be applied to the electrode 260 blocking the current flow through resistor 261, thereby producing an impulse which may be applied to the control grid of trigger tube 230.

Automatic deflecting control or automatic picture size, illustrated by the block diagram 262, may be obtained for vertical deflection by similar apparatus and associated circuits used in controlling the horizontal deflection which is also represented by the numeral 262. This equipment 262 varies the potential on grid 263 to control the current flow through the tube 233 as explained for the horizontal deflection; further explanation is thought to be unnecessary.

From the above description it is seen that horizontal and vertical scanning actions may be controlled by pulses of equal amplitude but of unequal duration, also that the vertical control signals cause both the vertical and horizontal backward retrace, so that upon reception of a vertical control signal the electron ray is deflected backward both vertically and horizontally from any point it has reached on the screen to immediately synchronize the receiver with the transmitter. Furthermore since the horizontal control signals produced at the transmitter include a pulse to cause the electron ray to be deflected backwards from the midpoint of the screen for the first line in alternate fields. The electron ray in the receiving tube will likewise be deflected backwards upon reaching substantially the mid-point of the screen in alternate fields to effect interlace scanning.

It is to be understood that picture signals only may be transmitted, in which case the sweep potentials may only be of such value as to cause the deflection of the electron ray across its associated screen.

Figure 10:
Figure 10 is a graphical view illustrating conventional horizontal and vertical control pulses.

In order to control television receivers from present day conventional control signals comprising a series of vertical signals of relatively long duration between groups of horizontal signals as illustrated in Figure 10 without using the usual arrangement of integrating and differentiating circuits, I employ an improved system whereby the horizontal backward deflection is started immediately upon the reception of a horizontal control signal and both the vertical and horizontal backward deflection is initiated upon the reception of the vertical control signals.

The conventional horizontal signals received would control the deflecting apparatus 146 and associated circuits in the manner as previously described to control the horizontal scanning actions and needs no further explanation.

With further reference to the vertical deflecting apparatus 147 and the associated circuits. Switches 246 and 247 may be operated to include the tubes 264, 265, and 266 in with the equipment of 147. Tubes 240 and 244 will function upon the reception of control signals as above described. The increased potential produced by charging condenser 242 is supplied through switch 246 to the control electrode 267 causing current to flow from the anode 268 to the cathode producing a voltage drop in resistor 269, which is applied to the grid 270 of tube 265 causing a positive pulse to be applied to the grid 271. Current may now flow upon reception of each vertical control signal from the anode 272 through the adjustable resistor 273 to charge the condenser 274. Horizontal control signals will not produce sufficient charge in potential on electrode 267 to permit anode cathode current to flow.

The condenser 274 charged momentarily during each vertical control or synchronizing signal will increase the plate potential in tube 266 which is applied through the adjustable contact 275 on load resistor 276, switch 247 to the control electrode 248. The contact 275 may be adjusted so that momentary charges from 6 or more successive impulses may be impressed on the electrode 248 before current starts to flow from the anode 250 to the cathode. The tube 249 will now function as described above to supply a positive pulse to the trigger tube 230 and to the trigger tube 266 to cause vertical and horizontal backward deflection of the cathode ray, and to condition the associated circuits for the reception of the next series of picture signals or picture signals and sound signals.

From the above it is seen that the scanning actions in the receiver may be controlled by horizontal and vertical signals comprising one vertical impulse between groups of horizontal signals or several successive vertical signals between groups of horizontal signals, and furthermore the cathode ray may be returned both vertically and horizontally from any location it has reached on its associated screen upon the reception of one or more vertical control signals.

In the various circuits shown and described I have simplified the drawings by indicating the source of potential by a sign. Also I have omitted the heater filaments for the various tubes, but it will be understood that such filaments are necessary.

The embodiments of the invention which have been given herein are illustrations of how the various features may be accomplished and the principles involved. It is to be understood that the invention contained herein is capable of embodiment in many other forms and adaptations, without departing from the spirit of the invention and the scope of the appended claims.

Having thus described my invention, I claim:

1. In a television system, a cathode ray tube having a screen and an electron ray directed toward the screen, first generator means to produce line saw tooth waves including line pulses to control the intervals of the line saw tooth waves, second generator means to produce frame saw tooth waves including frame pulses to control the intervals of the frame saw tooth waves, deflecting means under control of said saw tooth waves to cause the electron ray to scan lines in successive fields on said screen, means including a resistor-condenser network in series with an electron tube responsive to said frame pulses to change the interval of the first line saw tooth wave for alternate fields to cause the electron ray to scan different lines in alternate and intermediate fields on said screen, and a coupling between said second generator means and said first generator means to cause said frame pulses to control the last line saw tooth wave for each scanned field for interlocking line and frame scanning actions.

2. In a television system, a receiver to receive picture signals, line synchronizing pulses and individual frame synchronizing pulses occurring between groups of line pulses, means under control of said synchronizing pulses to produce line saw tooth waves, means under control of said frame pulses to produce frame saw tooth waves, a cathode ray viewing tube having an image screen and an electron ray directed toward the screen, line deflecting means including an amplifier responsive to said line saw tooth waves to cause horizontal forward and backward deflection of the electron ray across said screen, frame deflecting means responsive to said frame saw tooth waves to cause the electron ray to scan successive fields on said screen to produce thereon pictures from said picture signals, and means including an automatic regulating device coupled to said amplifier and responsive to said line saw tooth waves to control the horizontal forward speed of the electron ray.

3. In a television system, a receiver to receive a carrier wave modulated with picture signals, line synchronizing pulses and individual frame synchronizing pulses, occurring between groups of line pulses, each of the frame pulses of relatively long duration as compared to the duration of any one of the said line pulses, frame pulse selecting means comprising an electron tube having a resistor-condenser network for selecting the frame pulses from said received synchronizing pulses, said network being of such value as to render said tube conductive only to pulses of long duration to select and amplify each of the said frame pulses, line generator means under control of said synchronizing pulses to produce line saw tooth waves, means under control of said amplified frame pulses to produce frame saw tooth waves, a cathode ray viewing tube having an image screen and an electron ray directed toward the screen, line deflecting means including an amplifier responsive to said line saw tooth waves to cause horizontal forward and backward deflection of the electron ray across said screen, frame deflecting means responsive to said frame saw tooth waves to cause the electron ray to scan successive field on said screen to produce thereon pictures from said picture signals, and means including an automatic regulating device coupled to said amplifier and responsive to said line saw tooth waves to control the horizontal forward speed of the electron ray.

4. In a television system, a receiver to receive picture signals, line synchronizing pulses and individual frame synchronizing pulses occurring between groups of line pulses, means under control of said synchronizing pulses to produce line saw tooth waves, means under control of said frame pulses to produce frame saw tooth waves, a cathode ray viewing tube having an image screen and an electron ray directed toward the screen, line deflecting means responsive to said line saw tooth waves to cause horizontal deflection of the electron ray across said screen, frame deflecting means including an amplifier responsive to said frame saw tooth waves to cause vertical forward and backward deflection of the electron ray to scan successive fields on said screen to produce thereon pictures from said picture signals, and means including an automatic regulating device coupled to said amplifier and responsive to said frame saw tooth waves to control the vertical forward speed of the electron ray.

5. In a television system, first generator means to produce line saw tooth waves, second generator means to produce frame saw tooth waves, a cathode ray tube having an image screen and an electron ray directed toward the screen, means including a first electron tube under control of said line saw tooth waves to select a first recurring period of time and a second recurring period in the intervals of increasing ampltiude in said line saw tooth waves, deflecting means under control of said line and frame saw tooth waves to cause the electron ray to scan successive frames on said screen during said first recurring period to produce picture signals representative of a scene within the view of said cathode ray tube, means including a first gate amplifier under control of said first electron tube to transmit said picture signals during said first recurring period, means including a second gate amplifier under control of said first tube to transmit signals, representative of a message to accompany said picture signals, during said second recurring period, and means including a coupling between said first tube and said cathode ray tube to substantially extinguish the electron ray during said second recurring period.

6. In a television system, first generator means to produce line saw tooth waves, second generator means to produce frame saw tooth waves, a cathode ray tube having an image screen and an electron ray directed toward the screen, means including a plurality of electron tubes under control of said line saw tooth waves to select a first recurring period of time, a second recurring period and a third recurring period in the intervals of increasing amplitude in said line saw tooth waves, deflecting means under control of said line and frame saw tooth waves to cause the electron ray to scan successive fields on said screen during said first recurring period to produce picture signals representative of a scene within the view of said cathode ray tube, means including a first gate amplifier under control of a first one of said electron tubes to transmit said picture signals during said first recurring period, means including a second gate amplifier under control of said first electron tube to transmit signals, representative of a message to accompany said picture signals, during said second recurring period, means including a third gate amplifier under control of a second one of said electron tubes to transmit signals, representative of another message, during said third recurring period, and means including a coupling between said first electron tube and said cathode ray tube to substantially extinguish the electron ray during said second and third recurring period.

7. In a television system, a cathode ray tube having an image screen and an electron ray directed toward the screen, first generator means to produce line saw tooth waves, second generator means to produce frame saw tooth waves, means including a first electron tube and a second electron tube responsive to said line saw tooth waves to select a first recurring period of time, a second recurring period and a third recurring period in the intervals of increasing amplitude in said line saw tooth waves, deflecting means under control of said line and frame saw tooth waves to cause the electron ray to scan said screen in two directions during said first recurring period to produce picture signals representative of a scene within the view of said cathode ray tube, means including a first gate amplifier under control of said first electron tube to transmit said picture signals during said first recurring period, means including a second gate amplifier under control of said first electron tube to transmit signals, representative of a message to accompany said picture signals, during said second recurring period, and means including a third gate amplifier under control of said second electron tube to transmit signals representative of another message.

8. In a television system, a receiver to receive picture signals, spaced line synchronizing pulses and groups of frame synchronizing pulses occurring between groups of line pulses, each of the said frame pulses of relatively long duration as compared to the duration of any one of the said line pulses, frame pulse selecting means comprising a first resistor-condenser network of such value to select groups of long duration pulses from said received line and frame synchronizing pulses and an electron tube having a second resistor-condenser input network, said second network being of such value as to render said tube conductive only to the last pulse in each group of said selected frame pulses to produce single spaced frame pulses for the groups of said received frame pulses, line generator means under control of said line pulses and said single frame pulses to produce line saw tooth waves, frame generator means under control of said single frame pulses to produce frame saw tooth waves, a cathode ray tube having an image screen and an electron ray directed toward the screen, and deflecting means under control of said saw tooth waves to cause the electron ray to scan successive fields on said screen to produce thereon pictures from said picture signals.

9. In a television system, a cathode ray camera tube having an image screen and an electron ray directed toward the screen, generator means to produce first line saw tooth waves including line synchronizing pulses to control the duration of the line saw tooth waves, generator means to produce first frame saw tooth waves including frame synchronizing pulses to control the duration of the frame saw tooth waves, means including a first electron tube under control of said line saw tooth waves to select a first recurring period of time and a second recurring period in the intervals of increasing amplitude in said line saw tooth waves, deflecting means under control of said line and frame saw tooth waves to cause the electron ray to scan successive frames on said screen during said first recurring period to produce picture signals representative of a scene within the view of said camera tube, means to produce a carrier wave, a modulation amplifier, means including a first signal amplifier under control of said first electron tube for supplying said picture signals to said modulation amplifier during said first recurring period to transmit over said carrier wave, means including a second signal amplifier under control of said first electron tube for supplying message signals, representative of a message to accompany said picture signals, to said modulation amplifier during said second recurring period to transmit over said carrier wave, means including said modulation amplifier to transmit said synchronizing pulses over said carrier wave, a receiver to receive said picture signals, said message signals and said synchronizing pulses, a cathode ray viewing tube having a picture screen and an electron ray directed toward the screen, means under control of said received synchronizing pulses to produce second line saw tooth waves, means under control of certain of said received synchronizing pulses to produce second frame saw tooth waves, means associated with said receiver including a second electron tube under control of said second line saw tooth waves to select a first recurrent period and a second recurrent period corresponding to said first and second recurring periods, means including a first gate amplifier under control of said second electron tube to apply said received picture signals to said viewing tube during said first recurrent period, deflecting means under control of said second line and second frame saw tooth waves to cause the electron ray in the viewing tube to scan successive fields on said picture screen to produce pictures thereon from said received picture signals, a loud speaker, means including a second gate amplifier under control of said second electron tube to apply said received message signals to said speaker during said second recurrent period for producing a message.

10. In a television system, a receiver to receive a carrier wave modulated in successive rotation with picture signals representative of a scene being televised and signals representative of a message accompanying said picture signals, a cathode ray viewing tube having an image screen and an electron ray directed toward the screen, first generator means to produce line saw tooth waves, second generator means to produce frame saw tooth waves, means including a first electron tube under control of said line saw tooth waves to select a first recurring period of time and a second recurring period in the intervals of increasing amplitude in said line saw tooth waves, means including a first gate amplifier under control of said first electron tube to apply said picture signals to said cathode ray viewing tube during said first recurring period, deflecting means under control of said line and frame saw tooth waves to cause the electron ray to scan successive fields on said screen during said first recurring periods to produce pictures thereon from said picture signals, a signal reproducing device, means including a second gate amplifier under control of said first electron tube to apply said message signals to said device during said second recurring period for producing an audible message, and means including a coupling between said first electron tube and said viewing tube to substantially extinguish the electron ray during said second recurring period.

11. In a television system, a receiver to receive a carrier wave modulated in successive rotation with picture signals representative of a scene being televised, signals representative of a message accompanying said picture signals and synchronizing signals, a cathode ray tube having an image screen and an electron ray directed toward the screen, first generator means under control of said synchronizing signals to produce line saw tooth waves, second generator means under control of certain of the said synchronizing signals to produce frame saw tooth waves, means including a first electron tube under control of said line saw tooth waves to select a first recurring period of time and a second recurring period in the intervals of increasing amplitude in said line saw tooth waves, means including a first amplifier under control of said first electron tube to apply said picture signals to said viewing tube during said first recurring period, deflecting means under control of said line and frame saw tooth waves to cause the electron ray to scan successive fields on said screen during said first period to produce pictures thereon from said picture signals, a signal reproducing device, means including a second amplifier under control of said first electron tube to apply said message signals to said device during said second recurring period for producing an audible message.

12. In a television system, a receiver to receive in successive rotation picture signals representative of a scene being televised, first message signals representative of a message and second message signals representative of another message, a cathode ray tube having an image screen and an electron ray directed toward the screen, first generator means to produce line saw tooth waves, second generator means to produce frame saw tooth waves, means including at least a first electron tube and a second electron tube under control of said line saw tooth waves to select a first recurring period of time, a second recurring period and a third recurring period in the intervals of increasing amplitude in said saw tooth waves, means including a first gate amplifier under control of said first electron tube to apply said picture signals to said viewing tube during said first recurring period, deflecting means under control of said line and frame saw tooth waves to cause the electron ray to scan successive fields on said screen during said first period to produce pictures thereon from said picture signals, a signal reproducing device, a key, means including a second gate amplifier under control of said first electron tube to apply said first message signals through said key to said device during said second recurring period for reproducing an audible message, and means including a third gate amplifier under control of said second electron tube to apply said second message signals to said key.

JOHN H. HOMRIGHOUS.

REFERENCES CITED

The following references are of record in the file of this patent:

UNITED STATES PATENTS

| Number | Name | Date |
|---|---|---|
| 1,648,058 | Parker | Nov. 8, 1927 |
| 1,854,274 | Prinz | Apr. 19, 1932 |
| 2,022,969 | Mecham | Dec. 3, 1935 |
| 2,052,183 | Lewis | Aug. 25, 1936 |
| 2,089,639 | Bedford | Aug. 10, 1937 |
| 2,100,279 | George | Nov. 23, 1937 |
| 2,118,977 | Lewis | May 31, 1938 |
| 2,135,577 | Herbst | Nov. 8, 1938 |
| 2,146,876 | Zworykin | Feb. 14, 1939 |
| 2,152,234 | Ballard | Mar. 28, 1939 |
| 2,153,140 | Diehl | Apr. 4, 1939 |

(Other references on following page)

UNITED STATES PATENTS

| Number | Name | Date |
|---|---|---|
| 2,168,566 | Goldsmith | Aug. 8, 1939 |
| 2,176,973 | Manifold | Oct. 24, 1939 |
| 2,195,676 | McCarty | Apr. 7, 1940 |
| 2,199,202 | Hermann | Apr. 30, 1940 |
| 2,201,309 | Goldsmith | May 21, 1940 |
| 2,207,716 | Bumstead | July 16, 1940 |
| 2,211,926 | Goldmark | Aug. 20, 1940 |
| 2,233,778 | Lucian | Nov. 12, 1940 |
| 2,236,066 | Poch | Mar. 25, 1941 |
| 2,237,640 | Urtel | Apr. 8, 1941 |
| 2,241,586 | Dorsman | May 13, 1941 |
| 2,246,625 | Farnsworth | June 24, 1941 |
| 2,257,562 | Branson | Sept. 30, 1941 |
| 2,258,943 | Bedford | Oct. 14, 1941 |
| 2,261,762 | Hazeltine | Nov. 4, 1941 |
| 2,275,898 | Goldsmith | Mar. 10, 1942 |
| 2,282,046 | Goldsmith | May 5, 1942 |
| 2,304,057 | Schade | Dec. 1, 1942 |
| 2,307,212 | Goldsmith | Jan. 5, 1943 |
| 2,310,197 | Hansell | Feb. 2, 1943 |
| 2,326,515 | Bartelink | Aug. 10, 1943 |

| Number | Name | Date |
|---|---|---|
| 2,350,536 | Schlesinger | June 6, 1944 |
| 2,398,641 | Homrighous | Apr. 16, 1946 |
| 2,398,642 | Homrighous | Apr. 16, 1946 |
| 2,409,488 | Homrighous | Oct. 15, 1946 |
| 2,437,027 | Homrighous | Mar. 2, 1948 |
| 2,454,651 | Homrighous | Nov. 23, 1948 |

FOREIGN PATENTS

| Number | Country | Date |
|---|---|---|
| 554,468 | Great Britain | July 6, 1943 |
| 24,147 | Austria | Sept. 28, 1936 |
| 540,923 | Germany | Jan. 2, 1932 |
| 315,362 | Great Britain | Feb. 12, 1931 |

OTHER REFERENCES

Prin. of Tel. Eng., by Fink, 1940, pp. 40 to 43, 46 to 50 (McGraw Hill Book Co.), New York, N. Y.

Tel. Eng., by Wilson, 1937, pp. 317 to 354 (published by Sir Isaac Pitman and Sons, Ltd., London, England).